(12) United States Patent
Weber (10) Patent No.: US 8,281,584 B2
(45) Date of Patent: Oct. 9, 2012

(54) WOOD-PELLET COGENERATION UNIT WITH STIRLING ENGINE IN CONDENSING TECHNOLOGY

(76) Inventor: Eckhart Weber, Numberg (DE)

( * ) Notice: Subject to any disclaimer, the term of this patent is extended or adjusted under 35 U.S.C. 154(b) by 1094 days.

(21) Appl. No.: 12/087,748

(22) PCT Filed: Jan. 4, 2007

(86) PCT No.: PCT/EP2007/000037
§ 371 (c)(1),
(2), (4) Date: Jul. 11, 2008

(87) PCT Pub. No.: WO2007/082640
PCT Pub. Date: Jul. 26, 2007

(65) Prior Publication Data
US 2009/0078176 A1    Mar. 26, 2009

(30) Foreign Application Priority Data
Jan. 11, 2006    (DE) .......................... 10 2006 001 299

(51) Int. Cl.
*F01B 29/10*    (2006.01)
(52) U.S. Cl. ........................................... 60/524; 60/526
(58) Field of Classification Search ............. 60/517–526
See application file for complete search history.

(56) References Cited

U.S. PATENT DOCUMENTS

| | | | |
|---|---|---|---|
| 4,231,222 A * | 11/1980 | Fenton | 60/524 |
| 5,243,963 A | 9/1993 | Riener | |
| 6,293,275 B1 * | 9/2001 | Wunning | 126/91 A |
| 7,028,476 B2 * | 4/2006 | Proeschel | 60/616 |

FOREIGN PATENT DOCUMENTS

| | | |
|---|---|---|
| DE | 3924723 | 7/1989 |
| DE | 4440603 | 11/1994 |
| WO | 0284174 | 10/2002 |

\* cited by examiner

*Primary Examiner* — Hoang Nguyen
(74) *Attorney, Agent, or Firm* — Myers Andras LLP; Joseph C. Andras (57) ABSTRACT

In a wood-pellet cogeneration unit comprising a pellet feed, a combustion chamber, an ash removal device and a stirling engine, in order to achieve an optimum efficiency, provision is made for an exhaust gas recuperator (11) to preheat combustion air (10) and for wood pellets to be gasified with a portion of this hot air (13), for this portion (13) of the hot combustion air (10) to be directed above a grate (4) into a gasification combustion chamber (3a) and for the fuel gas (18) thus produced to be sucked downwards through the grate (4) together with the ash by a side channel blower (7), for the fuel gas (18) under the grate (4) to be displaced with a flow impulse of the rest (14) of the hot combustion air (10) in such a way that, firstly, a low lambda value close to the CO limit is maintained and, depending on the temperature of the combustion chamber (3b), the combustion at a central nozzle (19) is stabilized, or, with increasing temperature of the combustion chamber (3b), the state of flameless combustion increasingly appears, wherein a potential vortex (20) is produced in the combustion chamber (3b), said potential vortex (20) intensively mixing exhaust gas (6), fuel gas (18) and hot combustion air (14), such that fuel gas (18) and ash particles burn completely.

24 Claims, 6 Drawing Sheets

WOOD-PELLET COGENERATION UNIT WITH STIRLING ENGINE IN CONDENSING TECHNOLOGY

The invention relates to a wood-pellet cogeneration unit (wood-pellet CHP unit), comprising a pellet feed, a combustion chamber, an ash removal device and a stirling engine.

Such wood-pellet cogeneration units have recently become more interesting for decentralized electric power generation from biomass in small power units as cogeneration in single and multi-family dwellings. They are intended to replace conventional in-house heating systems and water heating and additionally generate as much electricity as possible which is supplied to the public network and is compensated according to the Renewable Energy Sources Act.

Such wood-pellet cogeneration units with stirling engine are not available yet on the world market as mass-produced devices yet. A number of makers of wood-pellet boilers have made efforts to equip their wood-pellet boilers with stirling engines such as Hoval in Liechtenstein or Energiebig in Austria. In such wood-pellet boilers, pellets are conveyed with a dosing screw to a grate, ignited there and burnt. The ash partly falls through the grate, is partly entrained with the flames and thus accumulates in the ash tray, on the floor of the boiler, in the flues and in the chimney and needs to be regularly removed there. The stirling engine protrudes with its heater head into the hot combustion zone, removes a portion of the high-temperature heat and generates from this portion of heat 20% electricity and 80% hot water for example, depending on its efficiency. The remainder of the high-temperature heat in the hot exhaust gas, once it has passed the stirling heater head, is converted at the boiler walls and the flues into hot water. That is the reason why such wood-pellet cogeneration units with stirling engine only produce very little electricity (5-10%) from the fuel, have large and heavy wood-pellet boilers and require frequent maintenance due to ash removal. Condensing-appliance technology is not yet used in wood-pellet boilers due to ash-related problems.

For the economic use of such cogeneration units in single- and multi-family houses it is mandatory that the highest possible percentage of electricity is generated.

A unit would be desirable which is as small as possible, compact and offers low-maintenance and which additionally uses condensing-appliance technology in addition to increase the overall efficiency. The invention is therefore based on the object of providing a wood-pellet cogeneration unit having a stirling engine with the properties as mentioned above.

This object is achieved in accordance with the invention in such a way that an exhaust gas recuperator preheats combustion air and wood pellets are gasified with a portion of said hot air (primary air);

said portion of the hot combustion air is directed above a grate in a gasification combustion chamber and the fuel gas thus produced is sucked downwards through the grate together with the ash by a side channel blower (strong extract ventilator);

the fuel gas under the grate is displaced with a flow impulse of the rest of the hot combustion air (secondary air) that firstly a low lambda value close to the CO limit is maintained and, depending on the temperature of the combustion chamber, the combustion at a central nozzle is stabilized or, with increasing temperature of the combustion chamber, the state of flameless combustion is increasingly obtained, wherein a potential vortex is produced in the combustion chamber, which vortex intensively mixes exhaust gas, fuel gas and hot combustion air, so that fuel gas and ash particle will burn completely.

The core of the invention is gasifying wood pellets at first with air preheated by the hot exhaust gas flow in a combustion chamber arranged about the heater head of the stirling engine and then to combust the same directly thereafter. The ash removal shall occur completely via the exhaust gas stream and with the condensed water from condensing-appliance technology.

In a preferred embodiment, the ash is sucked together with the exhaust gas through the exhaust gas recuperator and a condensing heat exchanger arranged downstream of the same, with such a high flow speed being maintained that ash particles cannot accumulate on the heat exchanger walls. The ash particles are mixed in the condensing heat exchanger with the condensed water obtained there, with the soluble parts dissolving in the condensed water and the non-soluble parts being scavenged and removed with the condensed water and the exhaust gas flow. As a result of the thorough mixture of exhaust gas, ash particles and condensed water, even fine particles such as fine dust or aerosols are washed out of the exhaust gas.

It is provided in a preferred embodiment that the mixture of exhaust gas, condensed water and ashes is separated before or after the side channel blower in an exhaust-gas/condensed water separator such as a cyclone.

It is provided in a preferred embodiment that ash particles which subside in the potential vortex in the combustion chamber are stirred up again by air jets or exhaust gas recirculation from air nozzles arranged in the floor of the combustion chamber and are removed from the combustion chamber.

In a preferred embodiment the control is made in such a way that momentary burner output is regulated through the speed of the side channel blower and is only determined by the heater head temperature of the stirling engine. The lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

In a preferred compact embodiment, the exhaust gas recuperator and the condensing heat exchanger are placed with their heat exchanger surfaces in a concentric manner about the combustion chamber and integrated in heat insulation.

Two preferred embodiments of the invention will be explained below in closer detail by reference to the drawings, wherein.

An electric heating 1 (FIG. 1) or a gas burner 2 is used for preheating beyond the ignition temperature of the wood pellets a gasification combustion chamber 3a which is not yet filled with the wood pellets and in which a grate 4 is arranged. A dosing screw 5a conveys pellets from a storage container 5d to the hot grate 4 via an inclined drop chute 5b and a perpendicular drop chute 5c. A side channel blower 7 situated in the exhaust gas flow 6 of the combustion chamber 3b sucks in combustion air 10 from the ambient environment via an outside jacket 8 of a double-wall condensing chimney 9. The combustion air 10 is heated up in a recuperator 11 from ambient temperature to close to combustion chamber temperature, such that the exhaust gas flow 6 flowing through the recuperator 11 in counter-flow from the combustion chamber is cooled from combustion chamber temperature to temperatures <200° C. The recuperator 11 is arranged between the combustion chamber 3b and the side channel blower 7 and forms an air preheating unit for the combustion air 10.

Figure 2:
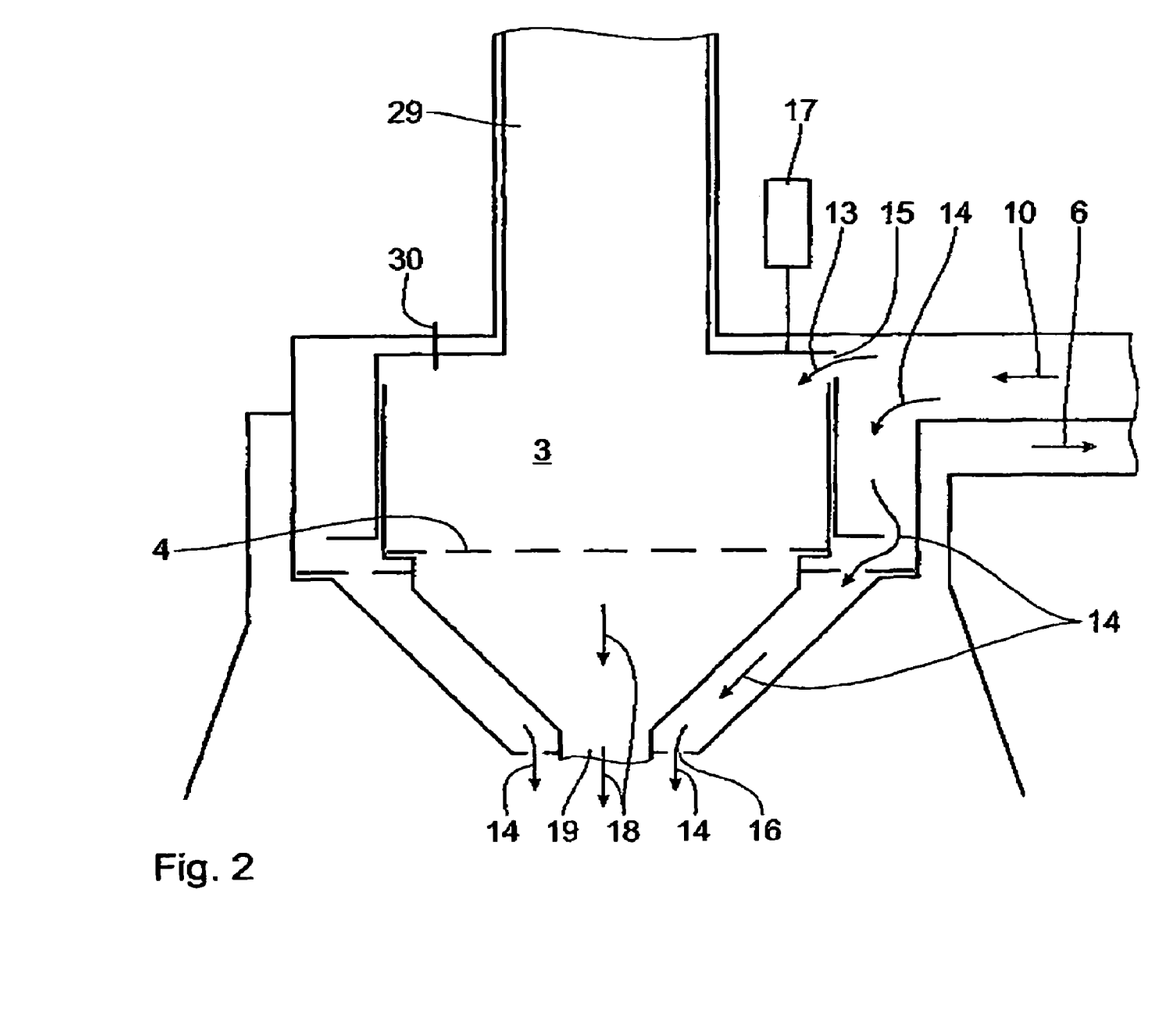
FIG. 2 shows an enlarged partial view of a gasification combustion chamber as shown in FIG. 1, with the special combustion air, fuel gas and exhaust gas guidance also being illustrated.

The now hot combustion air 10 is divided downstream of the recuperator 11 into two partial flows 13 and 14 (FIG. 2) controlled by a lambda probe 12 situated in the exhaust gas flow 6, such that the primary and secondary air openings 15, 16 in the gasification combustion chamber 3 are released more or less, such that as shown here by way of example, a micro-stepper (stepper motor) 17 of the upper part of the gasification combustion chamber 3 will lift or lower, through which the annular channel 16 as the secondary air nozzle is released more or less, Principally, the primary air 13 flows in above the grate 4, whereas the secondary air 14 flows in beneath the grate 4, as will be explained in FIGS. 3a to 3d in closer detail. Depending on the air quantity ratio of primary air and second air 13, 14, the pellets on grate 4 will be gasified or combusted by the hot primary air 13.

The fuel or burning gas 18 thus obtained is sucked downwards through the grate 4 and flows with a high flow velocity of up to over 20 m/s through a central nozzle 19 and, depending on the desired lambda value, is further additionally provided with a flow impulse of hot secondary air 14 from the ring channel or the nozzles 16 arranged in an annular manner. The high flow impulse generates in the combustion chamber 3b (FIG. 1) a potential vortex 20 which thoroughly mixes the exhaust gas 6, the secondary air 14 and the fuel gas 18, so that depending on the temperature of the combustion chamber the combustion is stabilized at the nozzle 19 or the combustion will spread over the entire combustion chamber with increasing temperature and can become flameless in the known manner due to the high exhaust gas recirculation rate, with combustion becoming especially clean and virtually no nitrogen oxide can be determined in the exhaust gas any more. The fuel gas 18 and fuel particles which occasionally fall through the grate 4 and are not fully combusted yet have a long average dwell time in the combustion chamber as a result of the potential vortex 20 and will combust completely.

Figure 1:
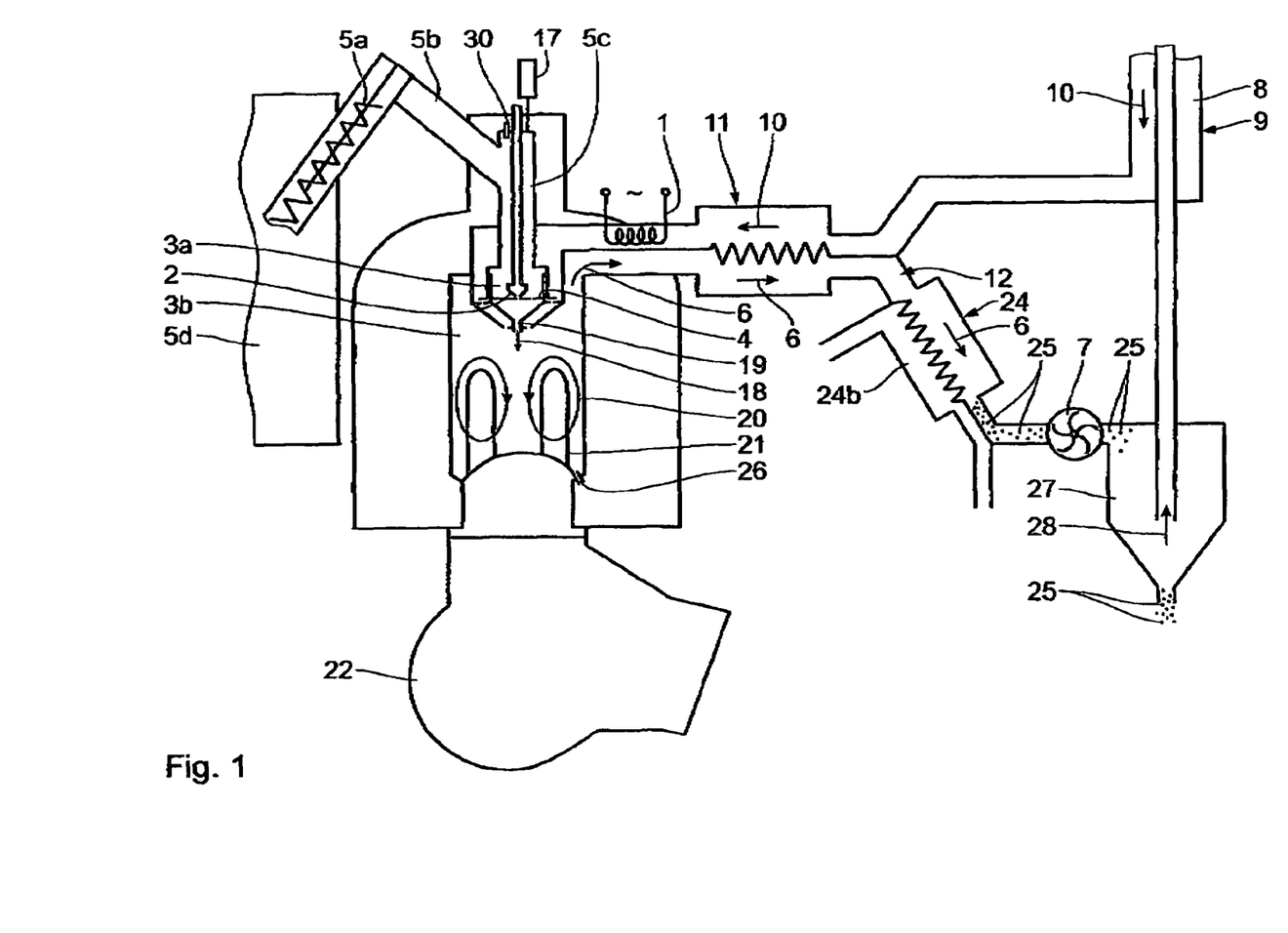
FIG. 1 shows a schematic overall view which illustrates all functional parts of the wood-pellet cogeneration unit according to a first embodiment.

Heater pipes 21 of a stirling engine 22 which are arranged in the combustion chamber are provided evenly with high-temperature heat through convection of the potential vortex 20 and the radiation of the hot combustion chamber walls 23. The still hot exhaust gas 6 leaves the combustion chamber via the recuperator 11 and is cooled there by the cool combustion air 10 which flows in reverse flow, as has already been described above.

After the recuperator 11, the exhaust gas 6 passes the lambda probe 12 and is then cooled beneath the dew-point in a condensing heat exchanger 24 by water cooling 24b from the housing heating recirculation. The water vapor of the exhaust gas 6 condenses into water droplets 25 and the heat of condensation is available as available heat in the cooling water. The lambda probe can also be arranged after the condensing heat exchanger, but then needs to be kept electrically at operating temperature.

Ash removal occurs completely through the exhaust gas stream 6. The flow velocity in the recuperator 11, condensing heat exchanger 24 and in the collecting channels to the side channel blower 7 is chosen so high that ash particles cannot accumulate. Any ash particles floating downwardly from the potential vortex 20 can be swirled up again by compressed air jets or exhaust gas recirculation from nozzles 26, so that they will be entrained in the potential vortex 20 and have the chance to receive the recuperator input in order to thus be removed.

The ash particles consist of water-soluble and non-water-soluble components. Biomass exhaust gas has a very high water vapor content. A liter of wood pellets causes approximately 0.25 liters of condensed water. The percentage of ash on the other hand is negligibly small, namely 0.001 liters. The water-soluble components of the ash dissolve in the water. The insoluble are washed out of the condensed water and fly together with the condensed water droplets through the side channel blower 7 into an exhaust-gas/condensed-water separator such as a cyclone 27. It discharges the dry exhaust gas 28 to the chimney (which is usually a plastic pipe, as is common practice in condensed-appliance technology) and the condensate 25 together with the minute quantity of ash particles to the sewage system. The condensate/ash mixture, which is a bright clear aromatic liquid, is ph-neutral and can also be collected so as to be used as mineral fertilizer. The exhaust gas which is washed out in this manner by the water condensation in the condensing heat exchanger 24, side channel blower 7 and cyclone 27 does not contain any fine dust any more. The dreaded loading of the atmosphere with aerosols (smog) and the combustion of solid fuels are avoided.

Figure 3A:
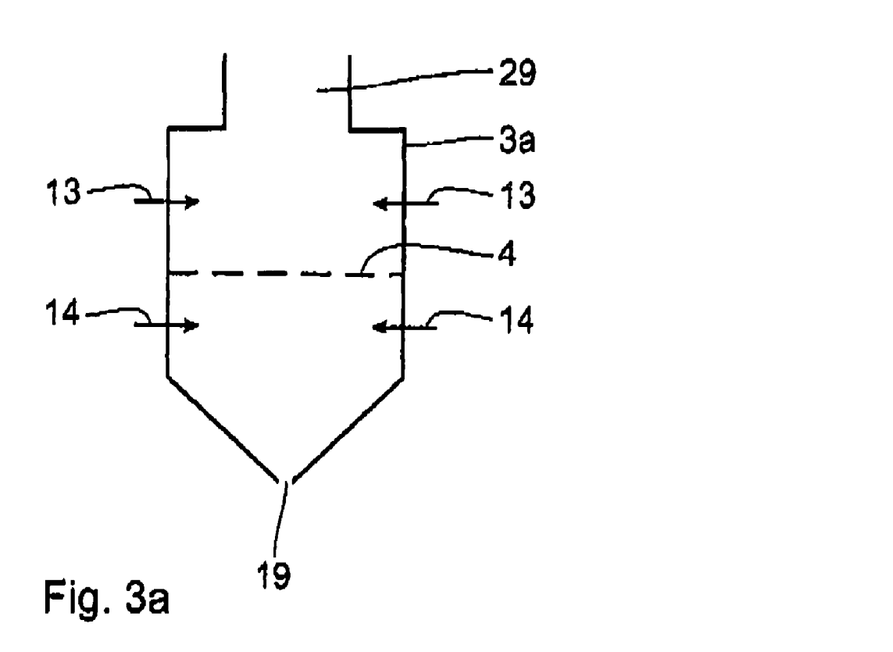
FIGS. 3a to 3d show the principal arrangement of the gasification combustion chamber with grate and special embodiments concerning primary air and secondary air guidance.
Figure 3B:
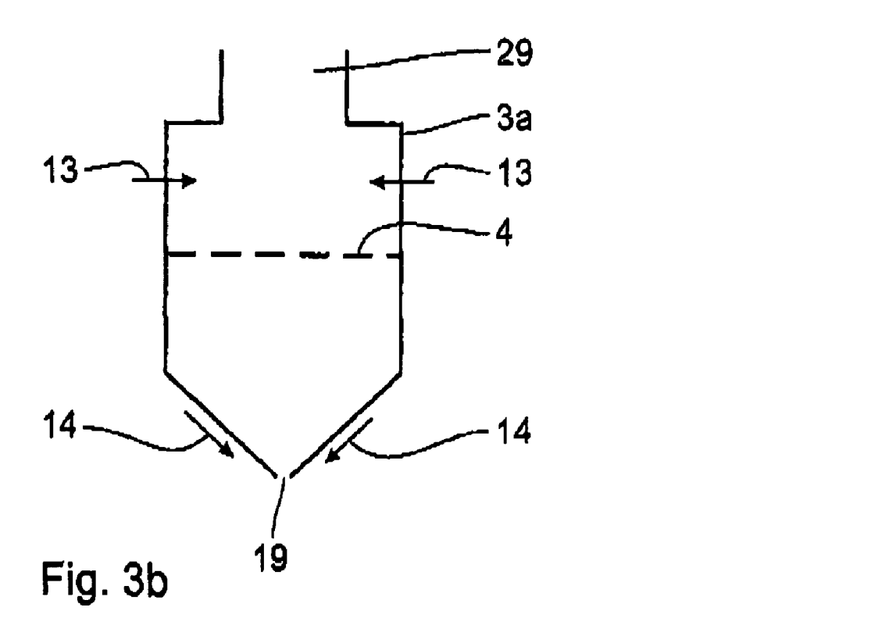

FIGS. 3a and 3b show two types of secondary air guidance in the principal configuration of the gasification combustion chamber 3a with grate 4, fuel supply 29 and central nozzle 19, namely a secondary air supply before nozzle 19 in FIG. 3a and a secondary air supply behind nozzle 19 in FIG. 3b. The setting of the ratio of primary air 13 to secondary air 14 occurs by lifting or twisting the gasification combustion chamber 3a, so that secondary air openings are opened more or less, as will be explained in closer detail in FIGS. 3c and 3d.

Figure 3C:
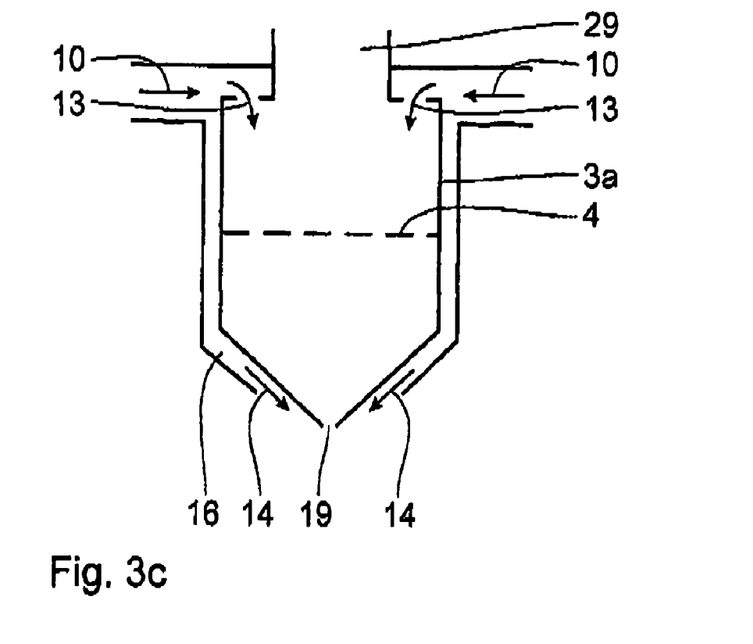
Figure 3D:
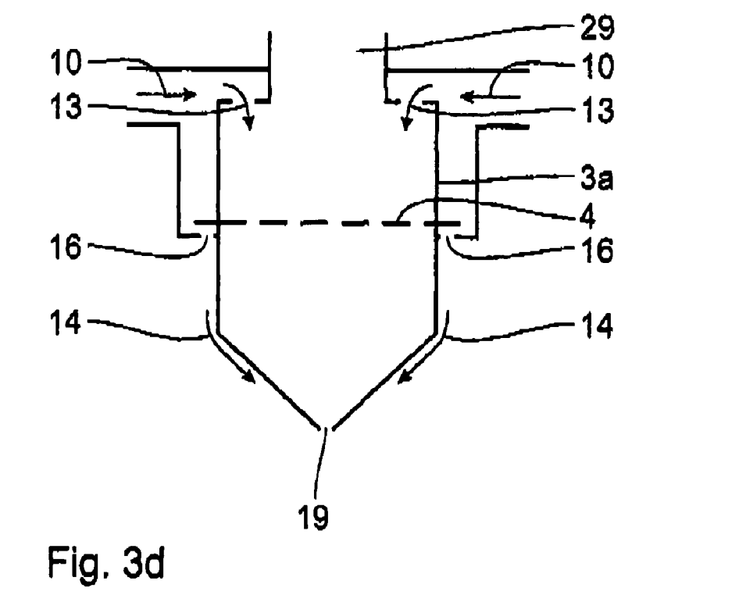

In FIG. 3c, the secondary air openings 16 are formed by an annular gap which is enlarged by lifting the gasification combustion chamber. In FIG. 3d, the secondary air openings 16 are holes arranged in the manner of a crown which are covered more or less by lifting or twisting the gasification combustion chamber 3.

A simple sturdy construction is necessary for the arrangement of the gasification combustion chamber 3 because everything is in the high-temperature range (700 to 1400° C.). This construction must enable a precise dosing of the secondary air 14 in order to place the lambda value close to the CO threshold (approx. lambda 1.5) because too much excess air would lead to a respective reduction in the electrical efficiency. Lambda 2.5 for example instead of lambda 1.5 for example leads to an electrical efficiency of only 25% instead of 30%. The walls of the gasification combustion chamber 3 and the air nozzles are cooled by the combustion air 10 which is "only" approx. 700° C. hot. Orate 4 must consist of ceramic materials.

Figure 4:
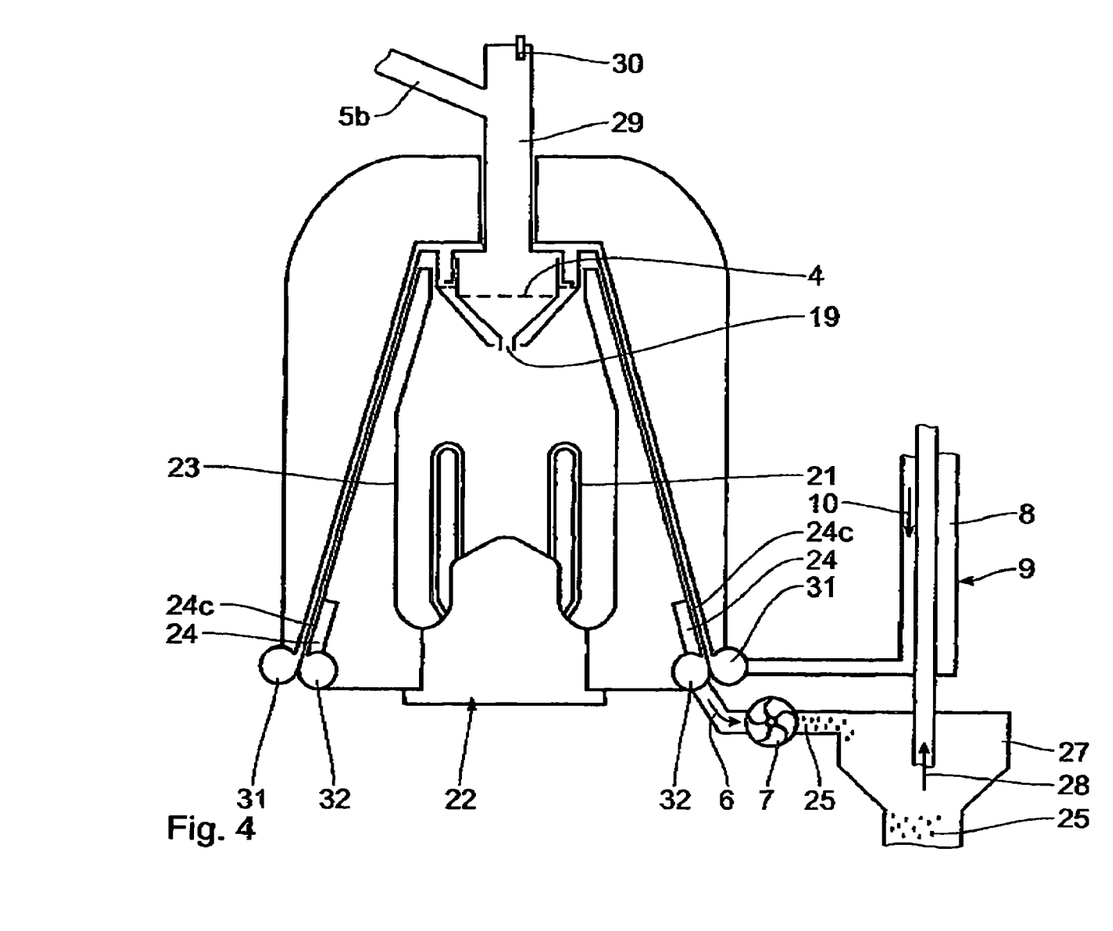
FIG. 4 shows a simplified schematic view of an especially compact wood-pellet cogeneration unit according to a preferred second embodiment.
Figure 5:
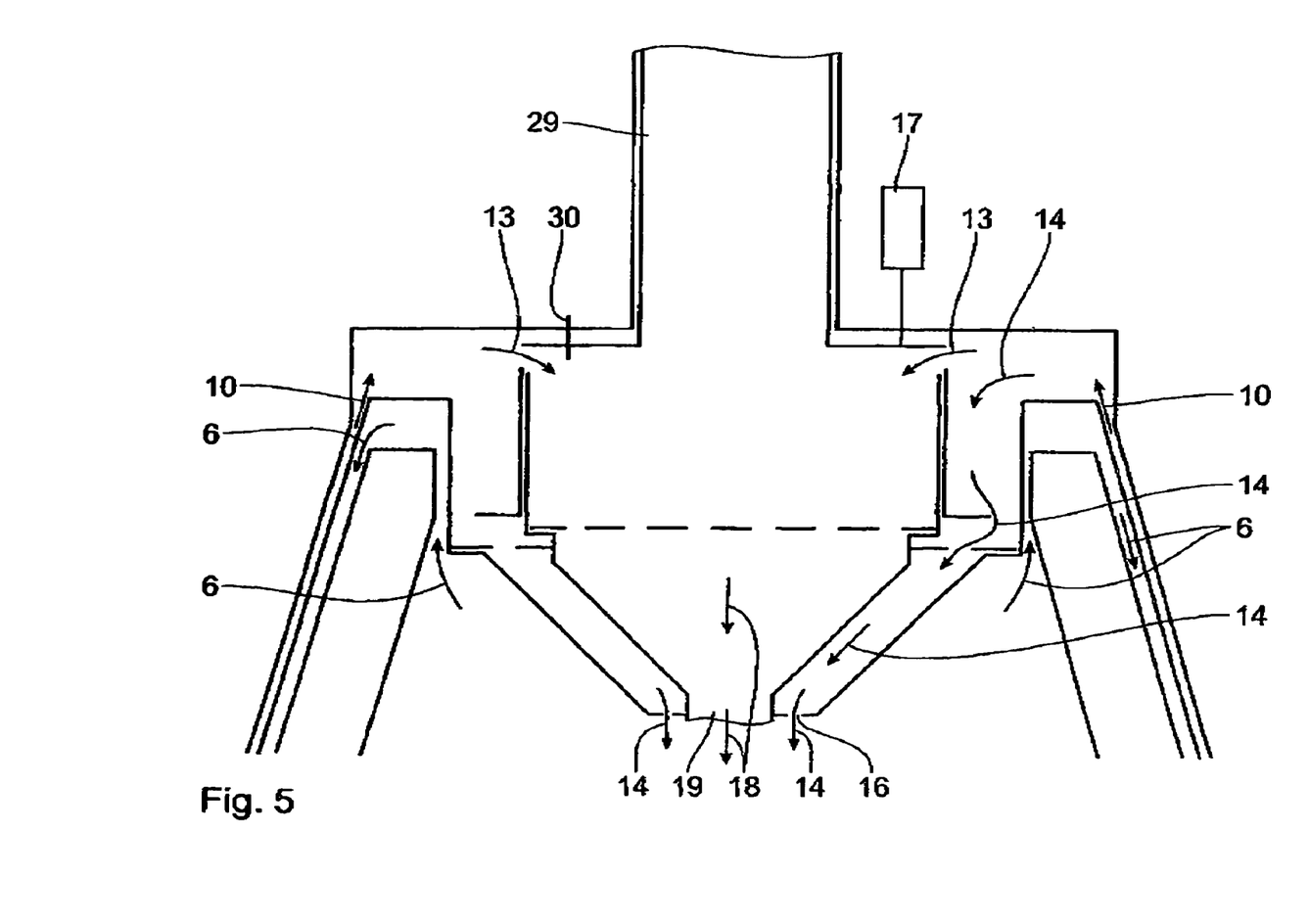
FIG. 5 shows an enlarged partial view of a gasification combustion chamber as shown in FIG. 4, with the special combustion air, fuel gas and exhaust gas guidance also being illustrated.

FIG. 4 shows an especially compact embodiment of the wood-pellet cogeneration unit with stirling engine 22, of which only the heater head is shown here. The exhaust gas recuperator 11 is placed with its heat exchanger surfaces in a concentric manner about the combustion chamber walls 23 and integrated in the heat insulation. In addition, a condensing heat exchanger 24 which is also arranged in a concentric manner at the bottom end of the recuperator 11 is provided. It is formed by a water-cooled inside surface 24c through which the exhaust gas flow 6 is guided. The concentric heat exchanger channels for combustion air and exhaust gas are connected via collecting channels 31, 32 to the condensing chimney 9 or to the side channel blower 7. FIG. 5 shows the combustion air and the exhaust gas guidance.

By exchanging the gasification combustion chamber 3a, it is possible to use different solid, liquid and gaseous fuels such as wood pellets, wood chips, plant oil, biogas, etc. Solid and liquid fuels are principally gasified by the preheated combustion air primary air) and burnt directly thereafter by addition of preheated secondary air. The preheating of the combustion air in the starting phase and the ignition of the gasified fuel occurs electrically or by a small (propane) gas heating burner.

The control of the wood-pellet cogeneration unit with stirling engine (not shown in the drawing) occurs according to the requirements of the stirling engine. In order to achieve a high electric efficiency, the heater pipe temperature must be kept at the upper permissible threshold even in the part-load range (approx. 850° C.). The momentary burner output is set by changing the side channel blower speed in such a way that the setpoint temperature of the heater pipes is held, irrespective of the speed and thus the power output of the stirling engine. Wood pellet supply is independent of momentary burner output. A light sensor 30 (FIGS. 1 and 4) recognize whether there are sufficient pellets on the embers, such that it measures infrared brightness for example above the bed of embers. If the embers are too bright, fresh pellets are re-supplied until the bright embers are covered accordingly and the supply will stop. The setpoint lambda value is set independent of the momentary burner output and momentary stirling engine output via the lambda probe by adjusting the quantity ratio of primary and secondary air.

The wood-pellet burner of the wood-pellet cogeneration unit is exceptionally suitable for generating high useful temperatures (higher than 700° C.) and is suitable for heating steam reformers in addition to the heating of stirling engines in order to generate hydrogen from methane or for heating high-temperature fuel cells. An especially practical embodiment in accordance with the invention which therefore merits special attention is that the ash is removed with the exhaust gas by an exhaust-gas heat exchanger and condensing heat exchanger and is washed out with the obtained condensed water from the exhaust gas and, after separation of exhaust gas and condensed water, is introduced into the sewage system with the same. By ensuring that energy is withdrawn from the exhaust gas by heating the combustion air, which energy thus remains in the combustion zone, the cogeneration unit needs less fuel and the electrical efficiency is respectively high (25-30%). The generated current can be sold through the Renewable Energy Sources Act at a fair price to utility companies. Economic viability is respectively high.

List of Reference Numerals
1 Electric heating
2 Gas burner
3a Gasification combustion chamber
3b Combustion chamber
4 Grate
5a Dosing screw
5b Inclined drop chute
5c Perpendicular drop chute
5d Storage container
6 Exhaust gas flow
7 Side channel blower
8 Outside jacket
9 Double-wall condensing chimney
10 Combustion air
11 Recuperator
12 Lambda probe
13 Primary air
14 Secondary air
15 Primary air openings
16 Secondary air openings, ring channel
17 Microstepper (stepper motor)
18 Fuel gas, combustible gas
19 Central nozzle
20 Potential vortex
21 Heater pipe
22 Stirling engine
23 Combustion chamber-wall
24 Condensing heat exchanger
24b Water cooling
25 Water droplets, condensate
26 Nozzles
27 Exhaust-gas/condensed water separator (cyclone)
28 Dry exhaust gas
29 Fuel supply
30 Brightness sensor
31 Collecting channel for combustion air
32 Collecting channel for exhaust gas

The invention claimed is:

1. A wood-pellet cogeneration unit, comprising a pellet feed, a combustion chamber, an ash removal device and a stirling engine, characterized in that
   an exhaust gas recuperator preheats combustion air and wood pellets are gasified with a portion of said hot air;
   said portion of the hot combustion air is directed above a grate in a gasification combustion chamber and the fuel gas thus produced is sucked downwards through the grate together with the ash by a side channel blower;
   the fuel gas under the grate is displaced with a flow impulse of the remainder of the hot combustion air that firstly a low lambda value close to the CO limit is maintained and, depending on the temperature of the combustion chamber, the combustion at the central nozzle is stabilized or, with increasing temperature of the combustion chamber, the state of flameless combustion is increasingly obtained, wherein a potential vortex is produced in the combustion chamber, which vortex intensively mixes exhaust gas, fuel gas and hot combustion air, so that fuel gas and ash particles will burn completely.

2. A wood-pellet cogeneration unit according to claim 1, characterized in that
   the ash is sucked together with the exhaust gas through the exhaust gas recuperator and a condensing heat exchanger arranged downstream of the same, with such a high flow speed being maintained that ash particles cannot accumulate on the heat exchanger walls;
   the ash particles are mixed in the condensing heat exchanger with the condensed wither obtained there, with the soluble parts dissolving in the condensed water and the non-soluble parts being scavenged and removed with the condensed water and the exhaust gas flow;
   as a result of the thorough mixture of exhaust gas, ash particles and condensed water, even fine particles are washed out of the exhaust gas.

3. A wood-pellet cogeneration unit according to claim 1 or 2, characterized in that the mixture of exhaust gas, condensed water and ashes is separated before or after the side channel blower in an exhaust-gas/condensed water separator such as a cyclone.

4. A wood-pellet cogeneration unit according to claim 3, characterized in that ash particles which subside in the potential vortex in the combustion chamber are stirred up again by air jets or exhaust gas recirculation from air nozzles arranged in the floor of the combustion chamber.

5. A wood-pellet cogeneration unit according to claim 4, characterized in that control is made in such a way that the momentary burner output of the gas burner is regulated through the speed of the side channel blower and is only determined by the heater head temperature of the stirling engine and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

6. A wood-pellet cogeneration unit according to claim 5, characterized in that the recuperator and the condensing heat exchanger are placed with their heat exchanger surfaces in a concentric manner about the combustion chamber and integrated in the heat insulation.

7. A wood-pellet cogeneration unit according to claim 4, characterized in that the recuperator and the condensing heat exchanger are placed with their heat exchanger surfaces in a concentric manner about the combustion chamber and integrated in the heat insulation.

8. A wood-pellet cogeneration unit according to claim 3, characterized in that control is made in such a way that the momentary burner output of the gas burner is regulated through the speed of the side channel blower and is only determined by the heater head temperature of the stirling engine, and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

9. A wood-pellet cogeneration unit according to claim 8, characterized in that the recuperator and the condensing heat exchanger are placed with their heat exchanger surfaces in a concentric manner about the combustion chamber and integrated in the heat insulation.

10. A wood-pellet cogeneration unit according to claim 3, characterized in that the recuperator and the condensing heat exchanger are placed with their heat exchanger surfaces in a concentric manner about the combustion chamber and integrated in the heat insulation.

11. A wood-pellet cogeneration unit according to claim 2, characterized in that ash particles which subside in the potential vortex in the combustion chamber are stirred up again by air jets or exhaust gas recirculation from air nozzles arranged in the floor of the combustion chamber.

12. A wood-pellet cogeneration unit according to claim 11, characterized in that control is made in such a way that the momentary burner output of the gas burner is regulated through the speed of the side channel blower and is only determined by the heater head temperature of the stirling engine, and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

13. A wood-pellet cogeneration unit according to claim 12, characterized in that the recuperator and the condensing heat exchanger are placed with their heat exchanger surfaces in a concentric manner about the combustion chamber and integrated in the heat insulation.

14. A wood-pellet cogeneration unit according to claim 11, characterized in that the recuperator and the condensing heat exchanger are placed with their heat exchanger surfaces in a concentric manner about the combustion chamber and integrated in the heat insulation.

15. A wood-pellet cogeneration unit according to claim 2, characterized in that control is made in such a way that the momentary burner output of the gas burner is regulated through the speed of the side channel blower and is only determined by the heater head temperature of the stirling engine, and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

16. A wood-pellet cogeneration unit according to claim 15, characterized in that the recuperator and the condensing heat exchanger are placed with their heat exchanger surfaces in a concentric manner about the combustion chamber and integrated in the heat insulation.

17. A wood-pellet cogeneration unit according to claim 2, characterized in that the recuperator and the condensing heat exchanger are placed with their heat exchanger surfaces in a concentric manner about the combustion chamber and integrated in the heat insulation.

18. A wood-pellet cogeneration unit according to claim 1, characterized in that ash particles which subside in the potential vortex in the combustion chamber are stirred up again by air jets or exhaust gas recirculation from air nozzles arranged in the floor of the combustion chamber.

19. A wood-pellet cogeneration unit according to claim 18, characterized in that control is made in such a way that the momentary burner output of the gas burner is regulated through the speed of the side channel blower and is only determined by the heater head temperature of the stirling engine, and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

20. A wood-pellet cogeneration unit according to claim 19, characterized in that the recuperator and the condensing heat exchanger are placed with their heat exchanger surfaces in a concentric manner about the combustion chamber and integrated in the heat insulation.

21. A wood-pellet cogeneration unit according to claim 18, characterized in that the recuperator and the condensing heat exchanger are placed with their heat exchanger surfaces in a concentric manner about the combustion chamber and integrated in the heat insulation.

22. A wood-pellet cogeneration unit according to claim 1, characterized in that control is made in such a way that the momentary burner output of the gas burner is regulated through the speed of the side channel blower and is only determined by the heater head temperature of the stirling engine, and the lambda value and the fuel supply are also independent of the momentary burner output, with the lambda value being regulated by adjustment of the quantity ratio of primary air to secondary air and the pellet supply being regulated by a light sensor by monitoring the reflection of the brightness of the upper side of the bed of embers.

23. A wood-pellet cogeneration unit according to claim 22, characterized in that the recuperator and the condensing heat exchanger are placed with their heat exchanger surfaces in a concentric manner about the combustion chamber and integrated in the heat insulation.

24. A wood-pellet cogeneration unit according to claim 1, characterized in that the recuperator and the condensing heat exchanger are placed with their heat exchanger surfaces in a concentric manner about the combustion chamber and integrated in the heat insulation.

* * * * *